United States Patent [19]

O'Neill

[11] Patent Number: 4,530,608

[45] Date of Patent: Jul. 23, 1985

[54] BASELINE CONTROL FOR A DIFFERENTIAL SCANNING CALORIMETER

[75] Inventor: Michael J. O'Neill, Wilton, Conn.

[73] Assignee: The Perkin-Elmer Corp., Norwalk, Conn.

[21] Appl. No.: 609,630

[22] Filed: May 14, 1984

[51] Int. Cl.³ .............................................. G01K 17/04
[52] U.S. Cl. ........................................ 374/11; 374/31; 236/78 A
[58] Field of Search ..................... 374/10, 11, 12, 13; 110/190, 191, 185; 236/78 A; 219/483, 486, 497, 501

[56] References Cited

U.S. PATENT DOCUMENTS

| | | | |
|---|---|---|---|
| 3,263,484 | 8/1966 | Watson et al. | 374/11 |
| 3,473,382 | 10/1969 | Tabeling | 374/13 |
| 3,732,722 | 5/1973 | Norem et al. | 374/12 |
| 4,040,288 | 8/1977 | Kotelnikov et al. | 374/11 |
| 4,330,933 | 5/1982 | Bullinger et al. | 29/612 |

*Primary Examiner*—Steven L. Stephan
*Assistant Examiner*—Thomas B. Will
*Attorney, Agent, or Firm*—E. T. Grimes; J. D. Crane

[57] ABSTRACT

A differential scanning calorimeter includes a baseline correction apparatus which simultaneously corrects for both linear and curvilinear heat flow variation between the sample and reference holders.

5 Claims, 5 Drawing Figures

BASELINE CONTROL FOR A DIFFERENTIAL SCANNING CALORIMETER

BACKGROUND OF THE INVENTION

The present invention generally relates to a differential scanning calorimeter and, in particular, relates to such a calorimeter having means for simultaneously correcting for linear and curvilinear baseline variations.

In general a differential calorimeter is a sophisticated analytical instrument which measures the thermal characteristics of a sample material. Specifically, a sample and a reference are controllably heated over time and the temperature of each monitored. The thermal characteristics of the reference are known and, preferably, the reference is chosen from a material which does not undergo a transformation during the analysis. Thus, when the sample undergoes a transformation, such as sublimation, boiling, or the like, that transformation is clearly discernable. By knowing the temperature at which the transformation occurs as well as the energy either absorbed or expended during the transformation the sample material can be rather accurately characterized.

In one type of calorimeter the sample and reference materials are placed in holders positioned within a block of thermally conductive material. The block is heated during analysis whereby the holders are subjected to substantially identical thermal conditions. Assuming that the block has a substantially uniform structure throughout, i.e. there are no air pockets or significant molecular structural defects, the heat transfer characteristics of the holders are effectively identical. Hence, the baselines of the thermographs taken are quite flat. The major drawback of this type of calorimeter is that, because of the large mass of the block, considerable time is lost before each analysis since all dynamic thermal gradients within the block must first be removed and a steady state maintained.

In another type of differential scanning calorimeter the sample holder and the reference holder are separately heated via individual dedicated heaters. Thus, the mass to be heated, i.e. only the holders, is significantly reduced resulting in an increased number of analysis during a comparable period of time. However, this arrangement introduces both linear and curvilinear changes in the measured baseline. These changes are due to the differences between the inherent heat loss characteristics of individual holders.

As a consequence, sample and reference holders for use in such an instrument are usually closely matched by the manufacturer and sold as a pair. Nevertheless, in a modern differential scanning calorimeter, the thermal differences between even the most carefully matched pair of holders results in measurable baseline changes. Conventionally, these changes can be separated into a linear change and a curvilinear change. Historically, in order to correct for these baseline changes an operator performed a two step procedure, first correcting for the curvilinear change and then correcting for the linear change. In order to improve the accuracy of the results of an analysis these steps would be repeated at least once. Clearly, this two step procedure can be time consuming although fortunately, this correction procedure needs to be performed relatively infrequently.

SUMMARY OF THE INVENTION

Accordingly, it is one object of the present invention to provide a differential scanning calorimeter which avoids a multi-step baseline correction procedure.

This object is achieved, at least in part, by providing a differential calorimeter with a means for simultaneously correcting both linear and curvilinear baseline variations.

Other objects and advantages will become apparent to those skilled in the art from the following detailed description read in conjunction with the appended claims and the drawing attached hereto.

BRIEF DESCRIPTION OF THE DRAWINGS

The drawings, not drawn to scale, include.

DETAILED DESCRIPTION OF THE INVENTION

Figure 1:
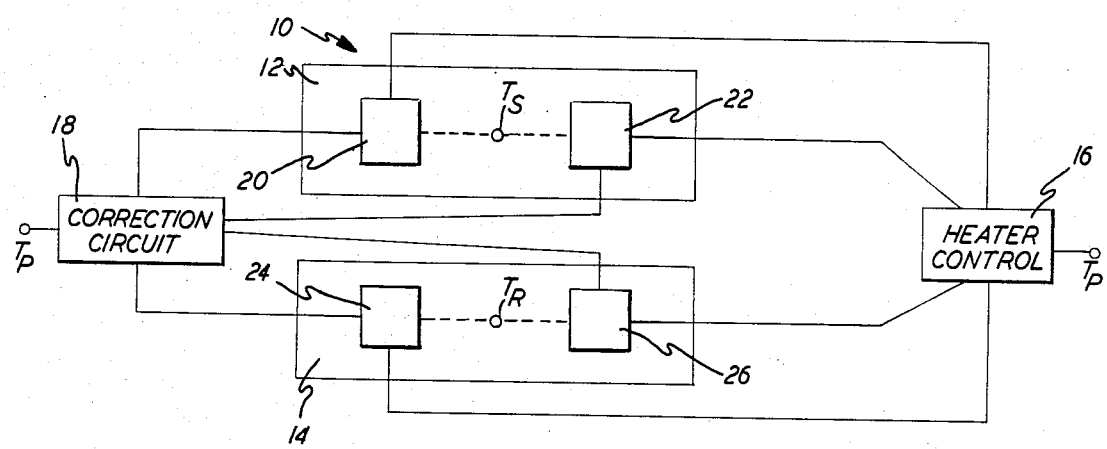
FIG. 1 which is a block diagram of a differential scanning calorimetric having a baseline correction control apparatus embodying the principles of the present invention.

A differential scanning calorimeter, generally indicated at 10 in FIG. 1 and embodying the principles of the present invention, includes a sample holder 12, a reference holder 14, means 16 for controllably heating the holders, 12 and 14, and a means 18 for simultaneously correcting for the inherent linear and curvilinear thermal differences between the sample holder 12 and the reference holder 14. In the preferred embodiment, the sample holder 12 has a heater 20 and a sensor 22 associated therewith. Likewise, the reference holder 14 has a heater 24 and a sensor 26 associated therewith.

Preferably, the sample and reference holders, 12 and 14 respectively, are of the type described in U.S. Pat. No. 3,732,722 issued to Norem et al. on May 15, 1973 and fabricated according to the method of U.S. Pat. No. 4,330,933 issued to Bullinger et al. on May 25, 1982. These patents are assigned to the assignee hereof and are hereby incorporated herein by reference.

To more throughly describe the present invention a brief review of the general operation of the differential scanning calorimeter 10 is provided below. After a sample and a reference material has been placed in the sample and reference holders, 12 and 14 respectively, the controllable heating means 16 is initiated. Thereupon, the means 16 provides power to the heaters, 22 and 24 according to a preprogrammed temperature profile. The sensors, 22 and 26, provide signals to the means 16 which signals are indicative of the actual temperatures of the holders, 12 and 14 respectively. During a sample material transition, i.e. melting, evaporation, or sublimation, more power is provided to one or the other heater, 20 or 24, to maintain the temperatures thereof identical. This differential power during a transition is a characteristic of the sample material. A more detailed description of this type of calorimeter is given in U.S. Pat. No. 3,263,484 issued to Watson et al. on Aug. 2, 1966 and assignee to the assignee hereof. This patent and the teaching thereof is incorporated herein by reference.

Figure 2A:
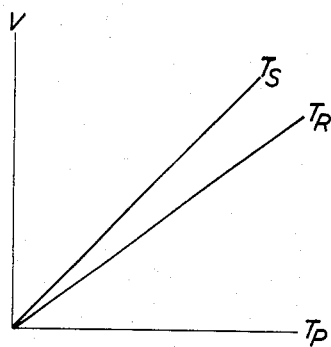
FIGS. 2A and 2B are graphs depicting the linear and curvilinear response in the calorimeter of FIG. 1.

In practice, because of the inherent difference between any two holders, even those most closely matched, there is a thermal dissipation difference therebetween. This difference in thermal dissipation includes a temperature related factor which is linear, and a power related dissipation factor which is curvilinear. A generalized graphic representation of the linear factor is shown in FIG. 2A. Therein, it is shown that as the voltage (v) applied to the heaters, 20 and 24, increases in response to an increase in the programed temperature ($T_p$) the actual temperature ($T_s$) of the sample holder 12 and the actual temperature ($T_r$) of the reference holder 14 diverge. This is a linear factor affecting the measured baseline of a thermogram.

Figure 2B:
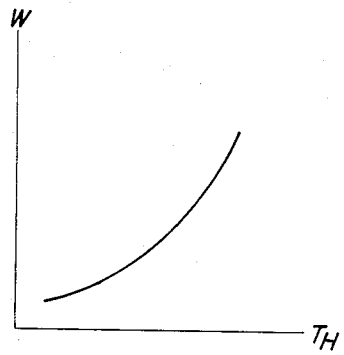

With specific reference to FIG. 2B the characteristic curve of power (W) versus holder temperature ($T_H$) is shown. As easily observed, such a power curve introduces non-linear, or curvilinear, errors in the measured baseline of a thermogram.

It will be understood that the means 18 for simultaneous correction for the linear and curvilinear characteristics shown in FIGS. 2A and 2B is used in addition to the means 16 for heating the holders, 12 and 14. That is, the correction effected by the means 18 is superimposed on the holders, 12 and 14, which are simultaneously being regulated by the means 16.

Figure 3:
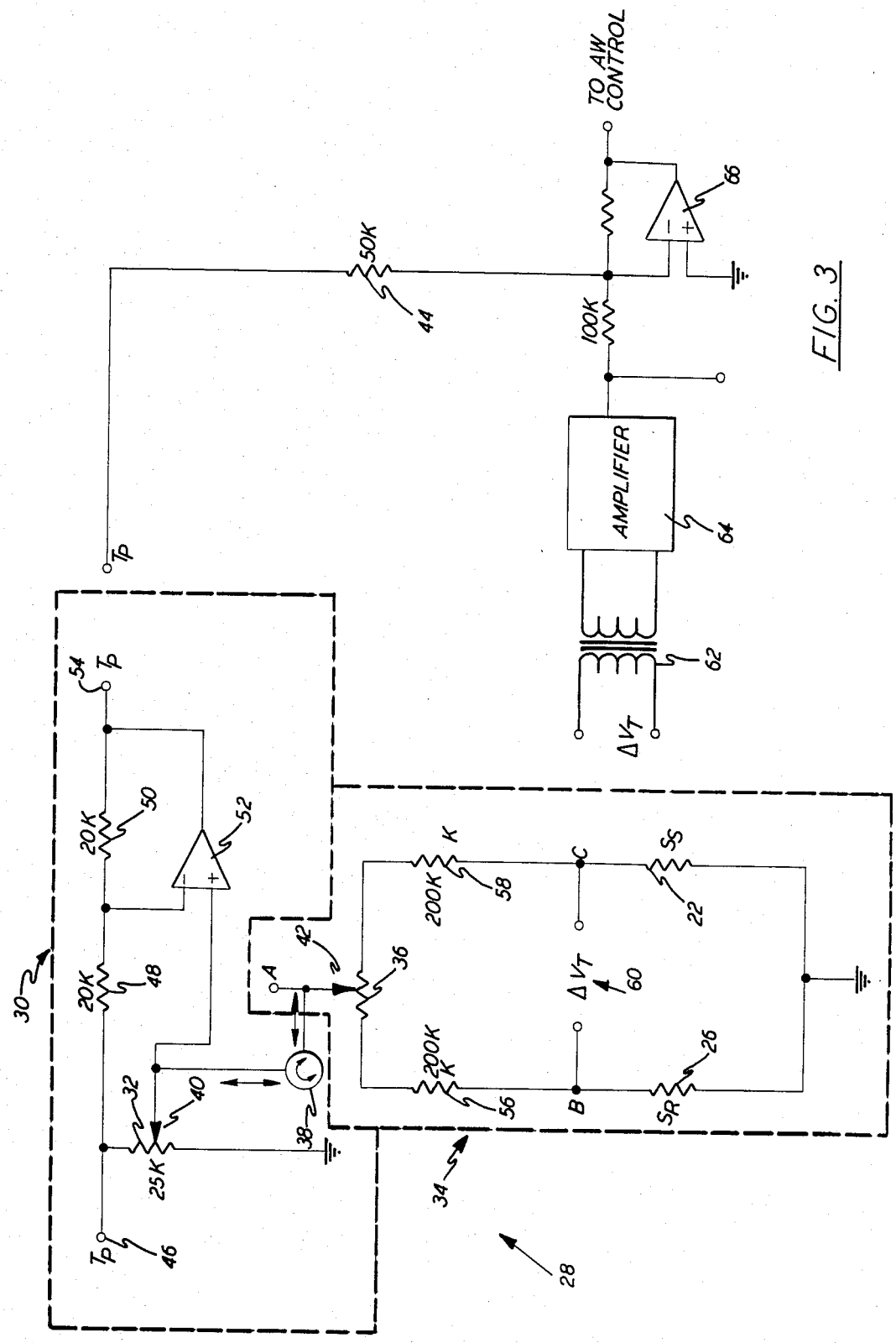
FIG. 3 is a schematic diagram of the correction means shown in FIG. 1.

Referring specifically to FIG. 3, a circuit 28 that is a basic element of the means 18 includes a voltage multiplier network 30 having a variable resistor 32 and a bridge circuit 34 having variable bridges balancing element 36. As shown, the effective values of the variable resistor 32 and the bridge balancing element 36 are simultaneously adjustable by a single control member 38. Preferably, the control member 38 adjusts movable contacts, 40 and 42, which tap the two resistors, i.e. the variable resistor 32 and the bridge balancing element 36, respectively. Thus, as indicated by the arrows, when the shaft of the potentiometer is rotated, the position of the contacts, 40 and 42, are moved simultaneously. As more fully discussed below the effect of the simultaneous variation of the resistors, 32 and 36, is regulated by a resistor 44 in series with the output of the voltage multiplier network 30.

The voltage multiplier network 30 has, at an input 46, a voltage representative of the programmed temperature. The network 30 includes first and second series resistors, 48 and 50, and a operational amplifier 52 which effectively acts as a resistor in parallel with the second series resistor 50. The value of this effective resistor being determined by the value of the variable resistor 32 as measured between the contact 40 and the input 46. Consequently, the output 54, of the voltage multiplier network 30 can be represented by $\beta T_p$; where $\beta$ is the multiplicative effect of the network 30.

Preferably, as shown in FIG. 3, the first and second series resistors, 48 and 50 are 20 Kohms and the variable resistor 32 has a maximum value of about 25 Kohms. In this embodiment, the operational amplifier is a type number 741 manufactured and marketed by Analog Devices Inc.

The bridge circuit 34, as shown in FIG. 3 is a resistive network having two legs connected at one end by a bridge balancing element 36 which is, preferably a variable resistor having a value of about 5 Kohms. The other end of the legs of the bridge 34 are connected to a common ground. Each leg of the bridge 34 includes a resistance element representative of a sensors, 22 or 26, of a holder, 12 or 14, respectively. In series with each of the sensor resistor elements is a second resistive element, 56 and 58, respectively, representative of the effective circuitry resistance as seen by the sensors 22 and 26. The output 60 of the bridge circuit 34 is taken at one side of the sensors, 22 and 26, and represents a differential voltage $\Delta V_T$ which is indicative of the voltage required to be supplied to the heaters, 20 or 24, to equalize the temperature of the holders, 12 or 14 respectively.

The output 60 of the bridge circuit 34 is amplified via a transformer 62 and a conventional amplifier 64. Preferably the transformer 62 is a Model 8315 manufactured and marketed by James Electronics and the amplifier 64 is a 335H manufactured and marketed by National Semiconductor. The combined multiplicative effect of the transformer 62 and amplifier 64 is on the order of about 10,000.

The output signal of the amplifier 64 is summed with the output of the voltage multiplier network 30 after that signal, $\beta t_p$, is scaled via resistor 44 in series therewith.

In operation, the voltage multiplier network 30 effectively corrects for the linear variations in the heat loss dissipation whereas the bridge circuit corrects for the curvilinear variation. In order to effect the simultaneous control of both the linear and curvilinear variations the effect of the simultaneous variation of the resistors, 32 and 36, must be proportionally adjusted. This proportionality adjustment, or scaling, is an inherent material characteristic associated with the holders, 12 and 14, and is determined by known calculation. In the circuit of FIG. 3 this factor is represented by resistor 44 which is preferably about 50 Kohms.

The amplified $\Delta V_T$ and the scaled $\beta T_p$ are summed, via, for example, an operational amplifier 66, to produce an output signal representing the actual differential power $\Delta W$, which must be provided to the holders, 12 and 14, to correct for the linear and curvilinear variations. This signal is the input to a voltage-to-power network 68 which is connected to the heaters 20 and 24.

Figure 4:
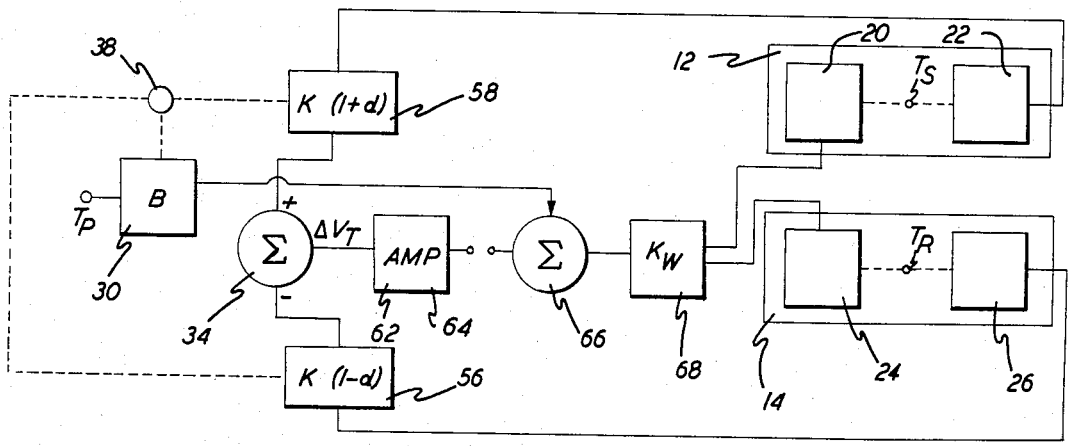
FIG. 4 is a block diagram of a baseline correction control apparatus.

The above-described circuit is shown as a block diagram in FIG. 4. It will be noted that the values of resistive elements, 56 and 58, representative of the circuit resistors are designated in FIG. 4 as being $K(1+\alpha)$ and $K(1-\alpha)$. The value of $\alpha$ is effectively that relative position of the bridge balancing element 36 associated with that particular leg of the bridge circuit 34.

The invention has been described herein with regard to a specific embodiment which is exemplary only. Hence, the present invention is deemed limited only by the claims and the reasonable interpretation thereof.

What is claimed is:

1. A differential scanning calorimeter correction control apparatus; said apparatus comprising:
a sample holder and a reference holder, each said holder having a heater element and a sensor element associated therewith; and
means for simultaneously compensating for both linear and curvilinear heat flow variations between said sample holder and said reference holder.

2. Apparatus as claimed in claim 1 wherein said means includes:
a voltage multiplier network for producing a signal for compensating for said linear heat flow variations;
a bridge balancing network for producing a signal for compensating for said curvilinear heat flow variations; and means for simultaneously varying at least one element of each of said networks whereby said compensating signals are simultaneously controlled.

3. Apparatus as claimed in claim 2 further comprising:

means for summing said compensating signals whereby a single correction signal is produced which single correction signal is representative of the power compensation required to compensate for said linear and curvilinear heat loss variations.

4. Apparatus as claimed in claim 2 wherein;
said voltage multiplier network includes a single variable resistor; and
said bridge balancing network including a single variable resistor.

5. Apparatus as claimed in claim 4 wherein said means for simultaneously varying said variable resistors is a single control member.

* * * * *